US007537101B2

(12) United States Patent

Aulanko et al.

(10) Patent No.: US 7,537,101 B2

(45) Date of Patent: May 26, 2009

(54) TRAVELATOR AND METHOD FOR SERVICING THE ELECTRICAL APPARATUS OF A TRAVELATOR

(75) Inventors: Esko Aulanko, Kerava (FI); Jorma Mustalahti, Hyvinkää (FI); Marc Ossendorf, Bochum (DE)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/032,460

(22) Filed: Feb. 15, 2008

(65) Prior Publication Data

US 2008/0156615 A1 Jul. 3, 2008

Related U.S. Application Data

(63) Continuation of application No. PCT/FI2006/000236, filed on Jul. 3, 2006.

(30) Foreign Application Priority Data

Aug. 18, 2005 (FI) ................................ 20050839

(51) Int. Cl.
*B65G 43/00* (2006.01)

(52) U.S. Cl. ....................... 198/322; 198/324; 198/321

(58) Field of Classification Search ................. 198/321, 198/324, 326, 322

See application file for complete search history.

(56) References Cited

U.S. PATENT DOCUMENTS

| | | | | |
|---|---|---|---|---|
| 950,796 | A * | 3/1910 | Seeberger | 198/324 |
| 3,150,757 | A * | 9/1964 | Minejiro | 198/324 |
| 3,191,743 | A * | 6/1965 | Rissler et al. | 198/323 |
| 3,583,325 | A * | 6/1971 | Melin | 198/324 |

FOREIGN PATENT DOCUMENTS

| | | | |
|---|---|---|---|
| DE | 101 61 759 | A1 | 7/2003 |
| GB | 2 205 803 | A | 12/1988 |
| JP | 4-365785 | * | 12/1992 |
| JP | 5-213573 | A | 8/1993 |
| JP | 9-151067 | A | 6/1997 |
| JP | 2000-118937 | A | 4/2000 |
| WO | WO-2005/042392 | A1 | 5/2005 |

* cited by examiner

*Primary Examiner*—James R Bidwell
(74) *Attorney, Agent, or Firm*—Birch, Stewart, Kolasch & Birch, LLP

(57) ABSTRACT

A conveyor system called a travelator which includes a frame section installed on top of a base section, including an electrical power unit for driving a conveyor system, an entry ramp and/or a departure ramp which forms a walking surface. The entry ramp and departure ramp are arranged on top of a fixed base and oriented in the general direction for conveying passengers.

14 Claims, 2 Drawing Sheets

TRAVELATOR AND METHOD FOR SERVICING THE ELECTRICAL APPARATUS OF A TRAVELATOR

FIELD OF THE INVENTION

Figure 1:
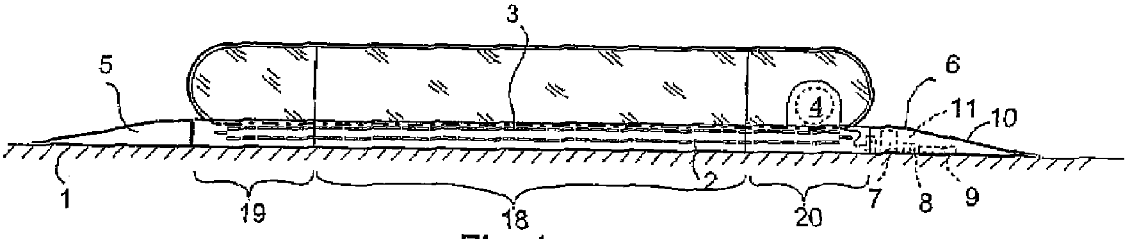

The present invention relates to a travelator as defined in the preamble of claim 1. In addition, the present invention relates to a method as defined in the preamble of claim 12.

BACKGROUND OF THE INVENTION

A travelator that is prior-art from publication WO 2005/042392, which comprises a frame that is installed on top of a fixed base, such as the floor or other support. The conveyor is supported on the frame. The conveyor is driven by an electrical power unit. The entry ramp and correspondingly the departure ramp forming the walking surface is arranged on top of a fixed base, such as the floor or other support, in the conveying direction of the conveyor before the conveyor and correspondingly after the conveyor. In addition there are normally various electrical devices in the travelator. This kind of travelator frame is necessarily very shallow in its structure, thus there is very little space within it. The space is mainly already filled with the parts of the drive machinery of the conveyor, thus placement of the electrical devices so that they are easily accessible for servicing becomes a problem.

PURPOSE OF THE INVENTION

The purpose of the invention is to eliminate the aforementioned drawback.

A particular purpose of the invention is to disclose a travelator wherein the electrical devices are easily accessible and serviceable.

A further purpose of the invention is to disclose a travelator that can be serviced quickly without long standstill times.

Another purpose of the invention is to disclose a method that enables servicing with a standstill time that is short as possible.

SUMMARY OF THE INVENTION

The travelator according to the invention is characterized by what is disclosed in claim 1. The method according to the invention is characterized by what is disclosed in claim 12.

The travelator according to the invention comprises a frame that is installed on top of a fixed base, such as the floor or other support; a conveyor, which is supported on the frame; an electrical power unit for driving the conveyor; an entry ramp and/or departure ramp or similar, which comprises a walking surface and which is arranged on top of a fixed base, such as the floor or other support, in the conveying direction of the conveyor before the conveyor or correspondingly after the conveyor; and electrical devices.

The entry ramp and/or the departure ramp or similar comprises a frame casing, in which is a hollow interior space, into which the electrical devices are placed.

Placing the essential electrical devices of the travelator in the ramp is advantageous from the standpoint of the space utilization and serviceability of the travelator.

In the method according to the invention for servicing the electrical equipment the travelator is stopped and closed to traffic, the entry ramp and/or departure ramp, which contains the electrical equipment requiring servicing, is detached from the travelator, a new or serviced entry ramp and/or departure ramp is connected to the travelator, the entry ramp and/or departure ramp requiring servicing is transported away from the travelator for servicing at the servicing site, the travelator is started and opened to traffic.

The electrical devices of the travelator are easy and quick to service with the method according to the invention as quickly as possible so that the standstill time is as short as possible. If the necessary service procedure is so time-consuming that it is not reasonable to perform at the operating location of the travelator, then the entry ramp and/or departure ramp requiring servicing can simply be detached from the travelator and replaced with a corresponding new or serviced one. The ramp requiring servicing is transported to the servicing site, where it can be serviced to operable condition in ergonomically good and safe conditions.

In one embodiment of the travelator the frame casing is a self-supporting module, which is detachably connectable to the frame.

In one embodiment of the travelator the frame contains a first connector, which is connected to the electrical equipment of the travelator, such as the power unit. The entry ramp and/or departure ramp includes a second connector, which is connected to the electrical equipment in the interior space of the ramp and is fitted to be connected to the first connector.

In one embodiment of the travelator the electrical equipment in the entry ramp and/or departure ramp includes a control means for controlling the functions of the travelator.

In one embodiment of the travelator the electrical equipment in the entry ramp and/or departure ramp includes a frequency converter or at least an inverter.

In one embodiment of the travelator the electrical equipment in the entry ramp and/or departure ramp includes a transformer.

In one embodiment of the travelator the frame casing includes a horizontal or inclined top surface, which forms a walking surface for passengers.

In one embodiment of the travelator the walking surface includes an aperture, through which the electrical equipment in the interior space is accessible, and a cover, that is openable and closeable with which the aperture can he covered.

In one embodiment of the travelator where the top surface is horizontal the entry ramp and/or departure ramp includes at least one step.

In one embodiment of the travelator the travelator is modular, such that the travelator includes a center module essentially fixed in place, which comprises a main part the length of the conveyor, and at least one end module detachably connected to the center module, which comprises a section of the conveyor shorter than the main part as well as the serviceable objects. The entry ramp and/or departure ramp is modularly detachable from and connectable to the end module and movable with the end module or separately.

In one embodiment of the travelator the travelator includes two end modules, which are modularly detachable from and connectable to the center module.

LIST OF FIGURES

Figure 2:
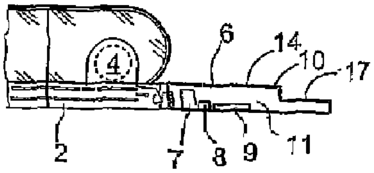
Figure 3:
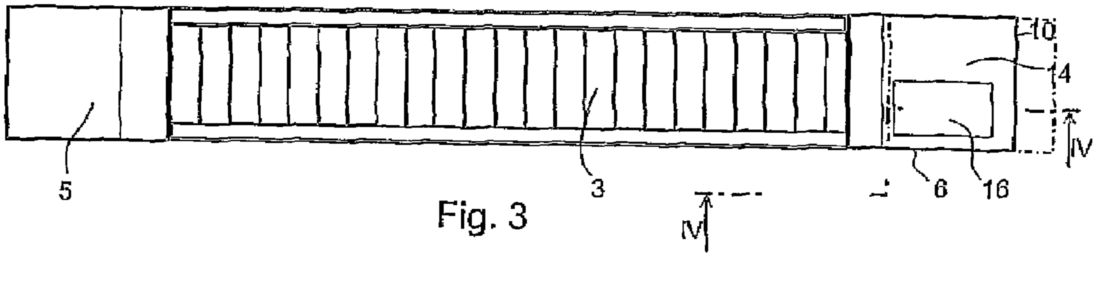
Figure 4:
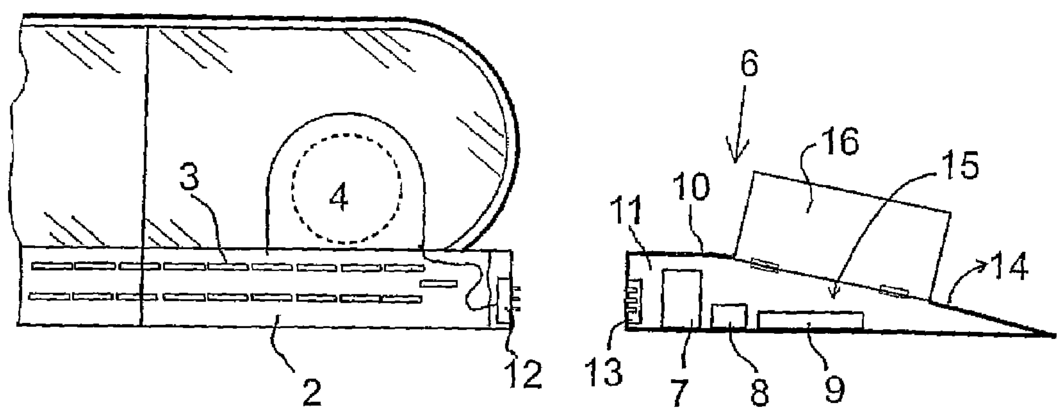
Figure 5:
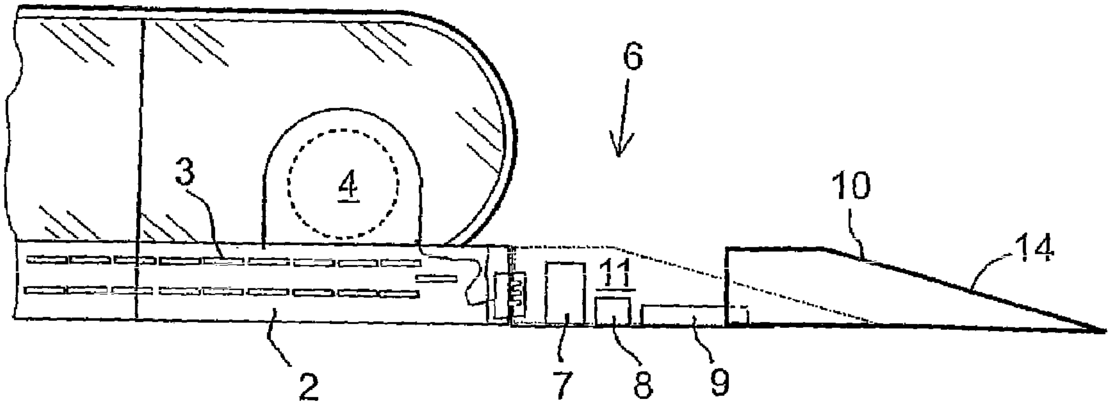

In the following, the invention will be described in detail by the aid of a few examples of its embodiments with reference to the attached drawings, wherein FIG. 1 presents a diagrammatic side view of a first embodiment of the travelator according to the invention, FIG. 2 presents a diagrammatic side view of part of a second embodiment of the travelator according to the invention, FIG. 3 presents a top view of the travelator of FIG. 1, FIG. 4 presents a IV-IV section of the travelator of FIG. 3 with the ramp detached and the cover open, and FIG. 5 presents a part of a third embodiment of the travelator according to the invention correspondingly to FIG. 4.

DETAILED DESCRIPTION OF THE INVENTION

FIGS. 1-5 show a travelator, which comprises a frame 2 installed on a fixed base 1, such as the floor or other support. The conveyor 3, which can be e.g. a pallet conveyor such as described in the same applicant's publication WO 2005/042391, wherein successive pallets move in an endless ring-like trajectory, in which there is an upper section, which acts as the actual track that transports passengers from the beginning to the end of the travelator, and a lower section, which acts as the track that transports the pallets from the end back to the beginning, is supported on the frame 2.

The travelator further comprises an electrical power unit 4, which is preferably a flat, permanent magnet synchronous motor that fits in a small space and is connected to the frame 2 above the level of the fixed base.

Viewed in the conveying direction (from left to right) of the conveyor of FIG. 1, the entry ramp 5 is before the conveyor 3 and correspondingly the departure ramp 6 is after the conveyor. The ramps 5 and 6 form a walking surface, along which passengers can walk onto the conveyor 3. In the figure the top surfaces 14 of the ramps 5, 6 are inclined, so that also wheelchairs can drive onto the conveyor 3. FIG. 2 presents a second option for the departure ramp 6, in which the top surface 14 is horizontal and includes a step 17.

The figures show that the departure ramp 6 comprises a frame casing 10, in which is a hollow interior space 11. The electrical devices 7, 8, 9 of the travelator are placed in the interior space 11 of the frame casing 10.

As illustrated in FIGS. 3 and 4, the top surface 14 of the frame casing 10 contains an aperture 15, via which the electrical devices 7, 8, 9 in the interior space 11 are easily accessible. The aperture 15 is covered with an openable and closeable cover 16. FIG. 5 shows an alternative structure of the frame casing 10 to the structure of FIG. 4, in which the cover 4 is not needed, but instead the frame casing 10 comprising the top surface 14 is moved away from its position above the electrical devices 7, 8, 9, which remain in their position, in which case the electrical devices are therefore exposed for inspection and servicing.

As illustrated in FIG. 4, the frame casing 10 of the ramp is preferably a self-supporting module, which can be moved as a single entity and which is detachably connected to the frame 2. In order to achieve an electrical or data connection the frame 2 of the travelator contains a first connector 12, which is connected to the electrical devices of the travelator, such as the power unit 4. The entry ramp and/or departure ramp 5, 6 includes a second connector 13, which is connected to the electrical devices 7, 8, 9 in the interior space 11 of the ramp and is fitted for connection to the first connector 12. Preferably an electrical connection is made between the first and second connector 12, 13 at the same time as the ramp 6 is physically attached to the frame 2 of the travelator.

The electrical devices in the entry ramp and/or departure ramp 5, 6 can include a control device 7 for controlling the functions of the travelator, a frequency converter or an inverter 8, a transformer 9 and other such electrical devices.

FIG. 1 illustrates also a preferred modular structure of the travelator. The travelator can include a center module 18 essentially fixed in its position, which comprises a main part the length of the conveyor 3.

Additionally there are two end modules 19, 20, which are modularly detachable from and connectable to the center module 18. The end modules 19 and 20 comprise a section of the conveyor 3, both shorter than the main part, and various serviceable objects. The entry ramp and/or departure ramp 5, 6 are modularly detachable from and connectable to the end module 19, 20 and movable with the end module or separately.

If the electrical equipment contained in the entry ramp 5 or the departure ramp 6 needs servicing and the service procedure would take a lot of time if performed on sites the travelator is stopped and closed to traffic. The entry ramp 5 or 6, which contains the defective electrical device in question, is detached from the end module 19 or 20 and the electrical connection 12, 13 between the ramp and the end module is removed. A corresponding new or serviced ramp is connected to the end module 19 or 20. The connectors 12 and 13 are connected to each other. The ramp 5 or 6 requiring servicing is transported away from the travelator for servicing at the site. Finally the travelator is started and re-opened to traffic.

The invention is not limited to apply only to the embodiments described above, but many modifications are possible while remaining within the framework of the inventive concept defined in the claims. For instance, when applying the invention the ramp used can be directed to incline or decline in another direction than the lengthwise direction of the travelator. The inventive concept is suited for application also in a casing instead of an inclining ramp, which has at least one step or which forms at least one step between the level of the floor supporting the travelator and the conveyor of the travelator.

The invention claimed is:

1. Travelator, which comprises a frame installed on top of a fixed base, such as the floor or other support, a conveyor, which is supported on the frame, an electrical power unit for driving the conveyor, an entry ramp and/or departure ramp or similar, which forms a walking surface and which is arranged on top of a fixed base, such as the floor or other support, in the conveying direction of the conveyor before the conveyor and/or likewise after the conveyor, and electrical devices, wherein the entry ramp and/or departure ramp or similar includes a frame casing, the frame casing, in which is a hollow interior space, into which the electrical devices of the travelator are placed, being a self-supporting module that extends from the level of the fixed base to the conveying level of the conveyer.

2. Travelator according to claim 1, further comprises the frame casing is a self-supporting module, which is detachably connectable to the frame.

3. Travelator according to claim 1 or 2, further comprises the frame contains a first connector, which is connected to the electrical equipment of the travelator, such as the power unit; and in that the entry ramp and/or departure ramp includes a second connector, which is connected to the electrical equipment in the interior space of the ramp and is fitted for connection to the first connector.

4. Travelator according to claim 1, further comprises the electrical equipment in the entry ramp and/or departure ramp (5, 6) includes a control means (7) for controlling the functions of the travelator.

5. Travelator according to claim 1, further comprises the electrical equipment in the entry ramp and/or departure ramp includes a frequency converter or at least an inverter.

6. Travelator according to claim 1, further comprises the electrical equipment in the entry ramp and/or departure ramp includes a transformer.

7. Travelator according to claim 1, further comprises the frame casing includes a horizontal or inclined top surface, which forms a walking surface for passengers.

8. Travelator according to claim 7, further comprises the top surface includes an aperture, through which the electrical equipment in the interior space are accessible, and a cover, with which the aperture can be covered in an openable and closeable manner.

9. Travelator according to claim 7 or 8, further comprises the top surface being horizontal the entry ramp and/or departure ramp includes at least one step.

10. Travelator according to claim 1, further comprises the travelator is modular such that the travelator includes a center module essentially fixed in place, which comprises a main part the length of the conveyor, and at least one end module detachably connected to the center module, which comprises a section of the conveyor shorter than the main part as well as the serviceable objects and in that the entry ramp and/or departure ramp is modularly detachable from and connectable to the end module and movable with the end module or separately.

11. Travelator according to claim 10, further comprises the travelator comprises two end modules, which are modularly detachable from and connectable to the center module.

12. Method of servicing an electrical apparatus of the travelator according to any of claims 1-9, comprising:

stopping the travelator is stopped and closing the travelator;

detaching the entry ramp and/or departure ramp, which contains the electrical device requiring service from the travelator;

connecting a new or serviced entry ramp and/or departure ramp to the travelator;

transporting the entry ramp and/or departure ramp requiring servicing away from the travelator for servicing at the servicing site;

starting the travelator and opening the travelator to traffic.

13. A travelator, comprising:

a frame installed on top of a fixed base, such as the floor or other support;

a conveyor, which is supported on the frame;

an electrical power unit for driving the conveyor;

an entry ramp and/or departure ramp or similar, the entry and/or departure rump forming a means for rising from the fixed base level to the conveying level of the conveyor and/or descending means for descending means for descending from the conveying level of the conveyer to the level of the fixed base;

a walking surface and which is arranged on top of a fixed base, such as the floor or other support, in the conveying direction of the conveyor before the conveyor and/or likewise after the conveyor; and electrical devices wherein the entry ramp and/or departure ramp or similar includes a frame casing, the frame casing, in which is a hollow interior space, into which the electrical devices of the travelator are placed, being a self-supporting module.

14. A travelator, comprising:

an entry ramp and/or departure ramp to access or depart from a travelator, the entry ramp and/or departure ramp being configured as a self-supporting module;

a frame, installed on top of a fixed base;

a conveyor, which is supported on the frame;

a first connector contained within the frame, and a second connector contained within the entry ramp and/or departure ramp, for electrical and data detachable interconnection;

an electrical power unit for driving the conveyor;

electrical equipment contained within the entry ramp and/or departure ramp that controls the operation of the travelator, the electrical equipment further comprising:

a frequency converter; and a transformer.

* * * * *